United States Patent
Tukmanov et al.

(10) Patent No.: US 12,142,941 B2
(45) Date of Patent: Nov. 12, 2024

(54) REVERSE POWERED WIRELESS DISTRIBUTION POINT

(71) Applicant: BRITISH TELECOMMUNICATIONS PUBLIC LIMITED COMPANY, London (GB)

(72) Inventors: Anvar Tukmanov, London (GB); David Townend, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 328 days.

(21) Appl. No.: 17/633,563

(22) PCT Filed: Aug. 4, 2020

(86) PCT No.: PCT/EP2020/071855
§ 371 (c)(1),
(2) Date: Feb. 7, 2022

(87) PCT Pub. No.: WO2021/028257
PCT Pub. Date: Feb. 18, 2021

(65) Prior Publication Data
US 2022/0294269 A1  Sep. 15, 2022

(30) Foreign Application Priority Data
Aug. 9, 2019  (EP) .................... 19191131

(51) Int. Cl.
*H02J 50/40* (2016.01)
*H02J 50/20* (2016.01)
(Continued)

(52) U.S. Cl.
CPC ............ *H02J 50/402* (2020.01); *H02J 50/20* (2016.02); *H02J 50/80* (2016.02); *H04B 10/808* (2013.01)

(58) Field of Classification Search
CPC .......... H02J 50/402; H02J 50/80; H02J 50/20; H04B 10/808
See application file for complete search history.

(56) References Cited

U.S. PATENT DOCUMENTS 8,363,564 B1  1/2013  Talley et al.
10,237,398 B2 * 3/2019  Kim .................. H04L 12/2869
(Continued)

FOREIGN PATENT DOCUMENTS

EP  2784987 A1  10/2014
EP  3163772 A1 * 5/2017  ............... G02B 6/42
(Continued)

OTHER PUBLICATIONS

Casa Systems: "Fttdp Solution Portfolio Overview", Press Release, 2021, 5 pages.
(Continued)

*Primary Examiner* — Adam D Houston
(74) *Attorney, Agent, or Firm* — PRANGER LAW PC

(57) ABSTRACT

Examples describe a method of operating a distribution point unit (DPU) having a wireless backhaul connection, such as a 4G or 5G connection. The distribution point unit is reverse powered electrically by connected subscriber lines. The radio configuration (number of antennas, frequencies, etc.) used by the wireless backhaul connection is switched according to the power available from the subscriber lines. Changes to the available power can trigger a switch to a new radio configuration. Higher capacities (data rates) can be achieved with higher power radio configurations, which can be switched over to if the available power is sufficient. Similarly, when the available power drops, a switch can be made to an appropriate lower powered radio configuration.

7 Claims, 4 Drawing Sheets

(51) Int. Cl.
  *H02J 50/80*  (2016.01)
  *H04B 10/80*  (2013.01)

(56) References Cited

U.S. PATENT DOCUMENTS

| | | | |
|---|---|---|---|
| 10,340,977 B2* | 7/2019 | Peker | H04B 10/808 |
| 11,071,034 B2 | 7/2021 | Tukmanov et al. | |
| 11,265,089 B2* | 3/2022 | Cooper | H04M 19/08 |
| 2007/0110005 A1 | 5/2007 | Jin et al. | |
| 2016/0037434 A1 | 2/2016 | Gopal et al. | |
| 2016/0164687 A1 | 6/2016 | Cooper | |
| 2016/0294441 A1 | 10/2016 | Fazlollahi et al. | |
| 2016/0309045 A1* | 10/2016 | Peker | H04M 19/08 |
| 2017/0187237 A1 | 6/2017 | Message Thebaudeau et al. | |
| 2017/0272581 A1 | 9/2017 | Cooper | |
| 2018/0006683 A1* | 1/2018 | Peker | H04M 19/02 |
| 2018/0006719 A1 | 1/2018 | Cress et al. | |
| 2018/0124235 A1* | 5/2018 | Kim | H04L 1/0006 |
| 2019/0036567 A1* | 1/2019 | Peker | H04L 12/10 |
| 2020/0348738 A1* | 11/2020 | Colombo | H02M 7/493 |
| 2022/0294269 A1* | 9/2022 | Tukmanov | H02J 13/00004 |

FOREIGN PATENT DOCUMENTS

| | | | | |
|---|---|---|---|---|
| GB | 2586233 A * | 2/2021 | | H04B 3/44 |
| JP | 2021129492 A * | 9/2021 | | H01M 10/44 |
| WO | WO-02063478 A2 | 8/2002 | | |
| WO | WO-2021028257 A1 * | 2/2021 | | H02J 13/00004 |

OTHER PUBLICATIONS

European Search Report for Application No. 19191131.2, mailed Feb. 17, 2020, 7 pages.
Farias F., et al., "Cost- and Energy-Efficient Backhaul Options for Heterogeneous Mobile Network Deployments", Photonic Network Communications, 2016, vol. 32, pp. 422-437.
International Search Report and Written Opinion for Application No. PCT/EP2020/071855, mailed on Oct. 7, 2020, 10 pages.
Santos R., "5G Backhauling with Software-defined Wireless Mesh Networks", 2018, 48 pages.
Search Report for Great Britain Application No. 1911452.9, mailed Jan. 22, 2020, 5 pages.
CN Office Action for 202080055955.0, dated Dec. 26, 2023, 7 pgs.
"Examination Report and Notification of Intention to Grant under Section 18(4) received for Great Britain Patent Application No. 1911452.9, mailed on Jul. 21, 2022", 2 pages.
"International Preliminary Report on Patentability received for PCT Patent Application No. PCT/EP2020/071855, mailed on Feb. 17, 2022", 7 pages.

* cited by examiner

| Radio Transceiver Configuration | Peak Capacity | Power Requirement |
|---|---|---|
| 5G mmWave + 5G Multi-band + 4G Multi-band | 1Gbps++ | 33W |
| 5G mmWave 5G Multi-band + | 1Gbps+ | 20W |
| 5G Single-band + 4G Multi-band | 900Mbps | 13W |
| 5G Single-band | 600Mbps | 7W |
| 4G Multi-band | 300Mbps | 6W |
| 4G Single-band | 150Mbps | 3W |

Figure 4

REVERSE POWERED WIRELESS DISTRIBUTION POINT

PRIORITY CLAIM

The present application is a National Phase entry of PCT Application No. PCT/EP2020/071855, filed Aug. 4, 2020, which claims priority from EP Patent Application No. 19191131.2, filed Aug. 9, 2019, each which is hereby fully incorporated herein by reference.

TECHNICAL FIELD

The present disclosure relates to a reverse powered wireless distribution point.

BACKGROUND

Providing high speed fixed broadband services such as VDSL2 and G.fast is dependent on minimizing the length of the copper pairs between the broadband customer premises equipment (CPE) and the distribution point unit (DPU) where the copper pairs are terminated. Fiber optic cable is typically utilized to connect the DPU to a telephone exchange. Line speeds increase as the length of copper decreases, so there is a move to locate DPUs closer to the customer, moving them from a cabinet to for example poles and even on the external walls of customers' premises. However, installing new fiber to these locations is costly and time consuming for the network operator or infrastructure provider.

Reverse power feeding (RPF) is a standardized technology (see ETSI TS 101548) that allows power to be sent from CPEs to a DPU in order to power the DPU. This simplifies deployment by removing the power dependency of DPUs. Nonetheless, fiber still needs to be installed from the exchange to the DPU.

SUMMARY

It is the aim of examples of the disclosure to provide a method of operating a distribution point having a high capacity wireless backhaul.

According to one aspect of the present disclosure, there is provided a method of operating a distribution point unit, the distribution point unit having a wireless backhaul connection and one or more electrically wired access connections to respective customer premises equipment, said distribution point unit being electrically powered by the one or more electrically wired access connections, the method comprising: determining a power available to the distribution point from the one or more electrically wired access connections; and switching the wireless backhaul connection from a first wireless configuration to a second wireless configuration based on the determined power available, wherein the first and second wireless configurations have different power utilizations.

The second wireless configuration may have a power utilization that is no greater than the available power. The second wireless configuration may have a higher power utilization than the first wireless configuration. The second wireless configuration may have a lower power utilization than the first wireless configuration.

The first and second wireless configurations may have different data rates.

The distribution point unit may further comprise a wired backhaul connection, and the power available for the wireless backhaul connection is reduced by the power required by the wired backhaul connection.

According to a further aspect of the present disclosure, there is provided a distribution point unit having a wireless backhaul connection and one or more electrically wired access connections to respective customer premises equipment, said distribution point unit being electrically powered by the one or more electrically wired access connections and adapted to: determine a power available to the distribution point from the one or more electrically wired access connections; and switch the wireless backhaul connection from a first wireless configuration to a second wireless configuration based on the determined power available, wherein the first and second wireless configurations have different power utilizations.

Examples of the disclosure provide traditional fixed line copper broadband services (DSL, VDSL, G.fast etc) using the fixed network distribution point, but which is backhauled to the core network using high capacity cellular radio technology. The backhaul capacity is scaled by scaling the radio transceiver capability with the available power that can be obtained from the reverse powered subscriber lines.

Such a solution can result in a more rapid deployment of faster fixed broadband services, which might otherwise be constrained by the fixed backhaul circuit (e.g. the copper line length to the exchange or the economic expense to lay new fiber to the distribution point unit). Utilizing reverse powering techniques from the subscriber lines is particularly advantageous as no new power infrastructure is needed to power the distribution point unit, and no new fiber or expensive upgrades are needed to improve the broadband speed delivered to the end customer. A fiber backhaul can be installed later to replace the wireless backhaul as necessary.

BRIEF DESCRIPTION OF THE DRAWINGS

For a better understanding of the present disclosure reference will now be made by way of example only to the accompanying drawings, in which:

FIG. 4 is a table showing various radio transceiver configurations with their associated capacity and power requirements.

DETAILED DESCRIPTION

The present disclosure is described herein with reference to particular examples. The disclosure is not, however, limited to such examples.

Examples of the present disclosure present a method of operating a distribution point unit (DPU) having a wireless backhaul connection, such as a 4G or 5G connection. The distribution point unit is reverse powered electrically by connected subscriber lines. The radio configuration (number of antennas, frequencies, etc.) used by the wireless backhaul connection is switched according to the power available from the subscriber lines. Changes to the available power can trigger a switch to a new radio configuration. Higher capacities (data rates) can be achieved with higher power radio configurations, which can be switched over to if the available power is sufficient. Similarly, when the available power drops, a switch can be made to an appropriate lower powered radio configuration.

Figure 1:
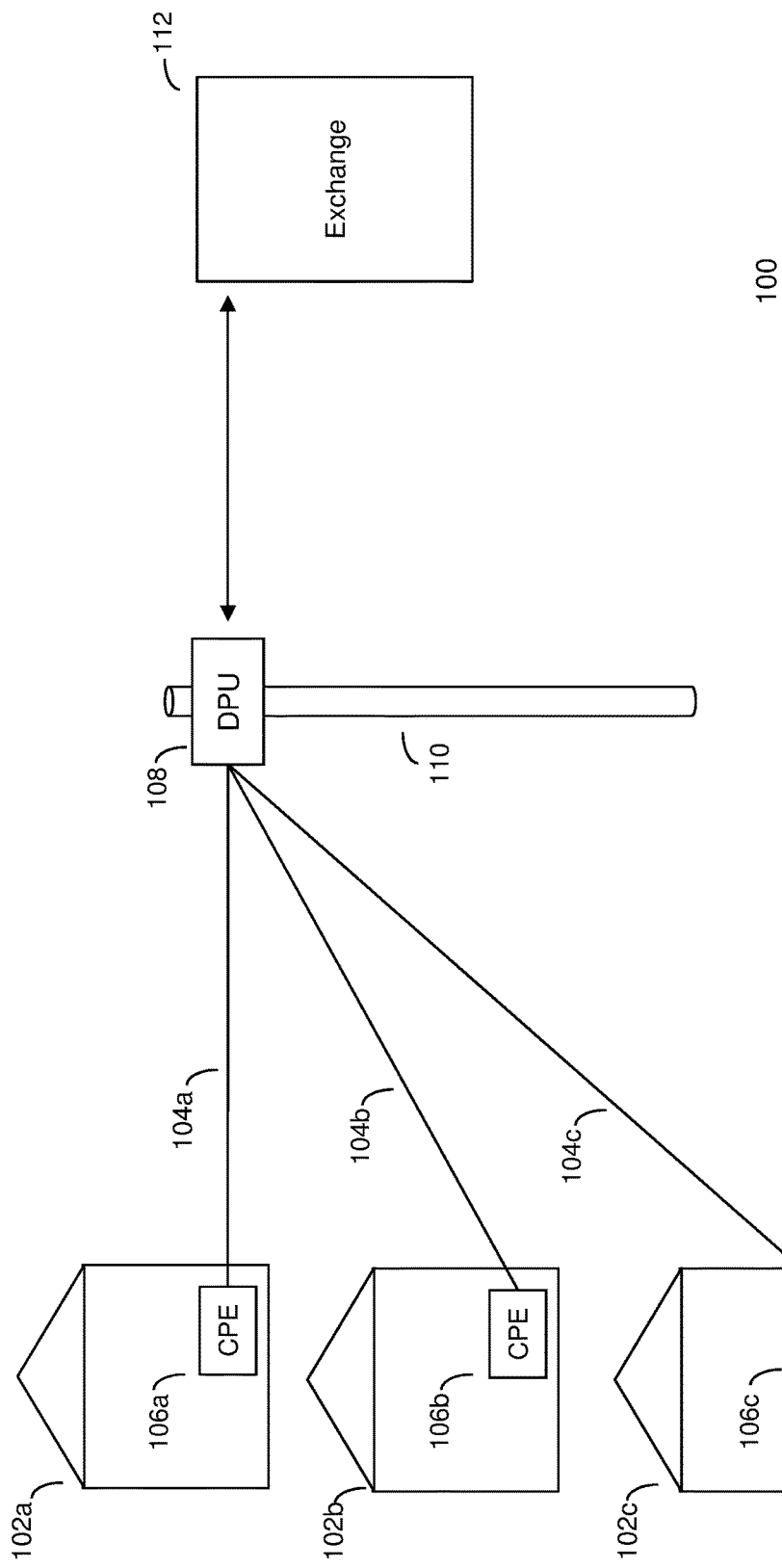
FIG. 1 is a system diagram showing a DSL network with several customer premises connected to a distribution point unit in an example of the disclosure.

FIG. 1 illustrates a telecommunications network 100 including 3 customer's premises 102a, 102b and 102c. Each of the customer's premises 102a, 102b and 102c is connected to a distribution point unit (DPU) 108 via respective telephone lines 104a, 104b and 104c. Each of the telephone lines is a twisted copper or aluminum pair of wires.

Specifically, a customer premises equipment 106a, 106b or 106c, connect to the end of each of the lines at the customer premises end.

In this example, the DPU 108 is located on a pole, but could be located elsewhere, such as beneath ground or in a street cabinet. The DPU 108 includes wireless radio transceivers that provide a wireless backhaul connection to a telephone exchange 112, for example over 4G, 5G or a combination of the two. Note, the physical antenna may be separately located from the DPU for optimal placement, and connected to the DPU via suitable connection such as coaxial cable. The DPU 108 is reverse powered by one or more the connected lines, which are electrically powered by their respective CPE. Similarly, the modem 212 and transceivers can be located separately from the rest of the DPU and connected via a suitable Ethernet connection.

The telephone exchange 112 includes a digital subscriber line access multiplexer (DSLAM), not shown. The DSLAM provides digital subscriber line (DSL) services, such as VDSL or G.fast, to connected lines and associated customer premises.

Figure 2:
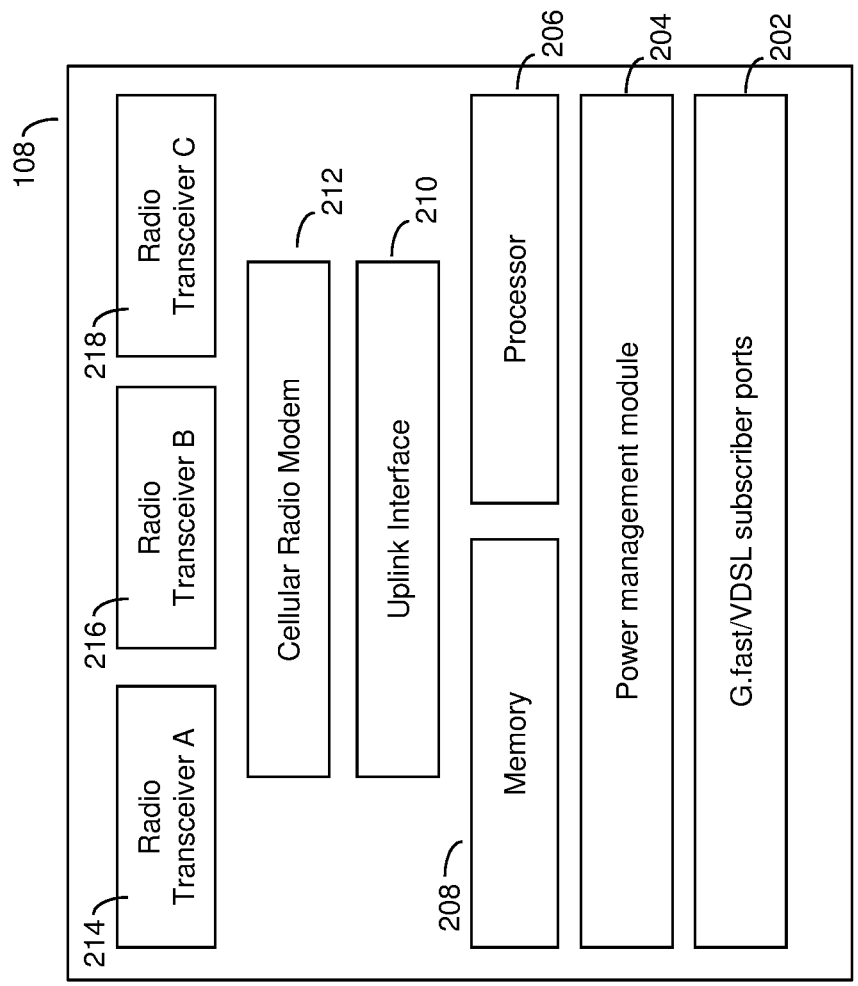
FIG. 2 is schematic diagram showing the main components of a distribution point unit in an example of the disclosure.

FIG. 2 shows the main components of the DPU 108 in an example of the disclosure. The DPU 108 comprises the DSL subscriber ports 202, a power management module 204, a processor 206, memory 208, an uplink interface 210, a cellular radio modem 212, and several radio transceivers 214, 216 and 218.

The DSL subscriber port 202 is the interface at which the physical and lower protocol layer logical connections from the customer premises is first aggregated, this is typically a twisted pair phone line.

The power management module 204 is capable of determining the power requirements from all constituent parts of the solution as well as monitoring available power delivered by connecting CPEs. It is capable of determining the minimum operating power required for each port and deriving the residual power budget that could be offered to other circuitry or components.

The processor 206 executes operational processes from all components and performs calculations for determining the optimal radio configuration based on information provided by the power management module 204.

The memory 208 stores the persistent operating system/code and configuration files required by all the components and is accessed by the processor 206.

The uplink interface 210 is where a fiber or copper connection is usually established for the backhaul into the core network. In examples of this invention, the uplink interface 210 is routed to (or shared with) the cellular radio modem 212 for onward forwarding of user traffic to the network over a wireless backhaul connection. The cellular radio modem 212 and associated radio transceivers 214, 216 and 218 are responsible for handling the radio protocols and physical radio modulation (respectively) that are necessary for establishing a wireless radio connection to a wider area cellular basestation site (for example, the exchange 112) for connectivity back into the core network. The modem 212 may control multiple transceivers and their configurations for optimal use with particular technologies or radio frequencies, as will be described in examples below.

Figure 3:
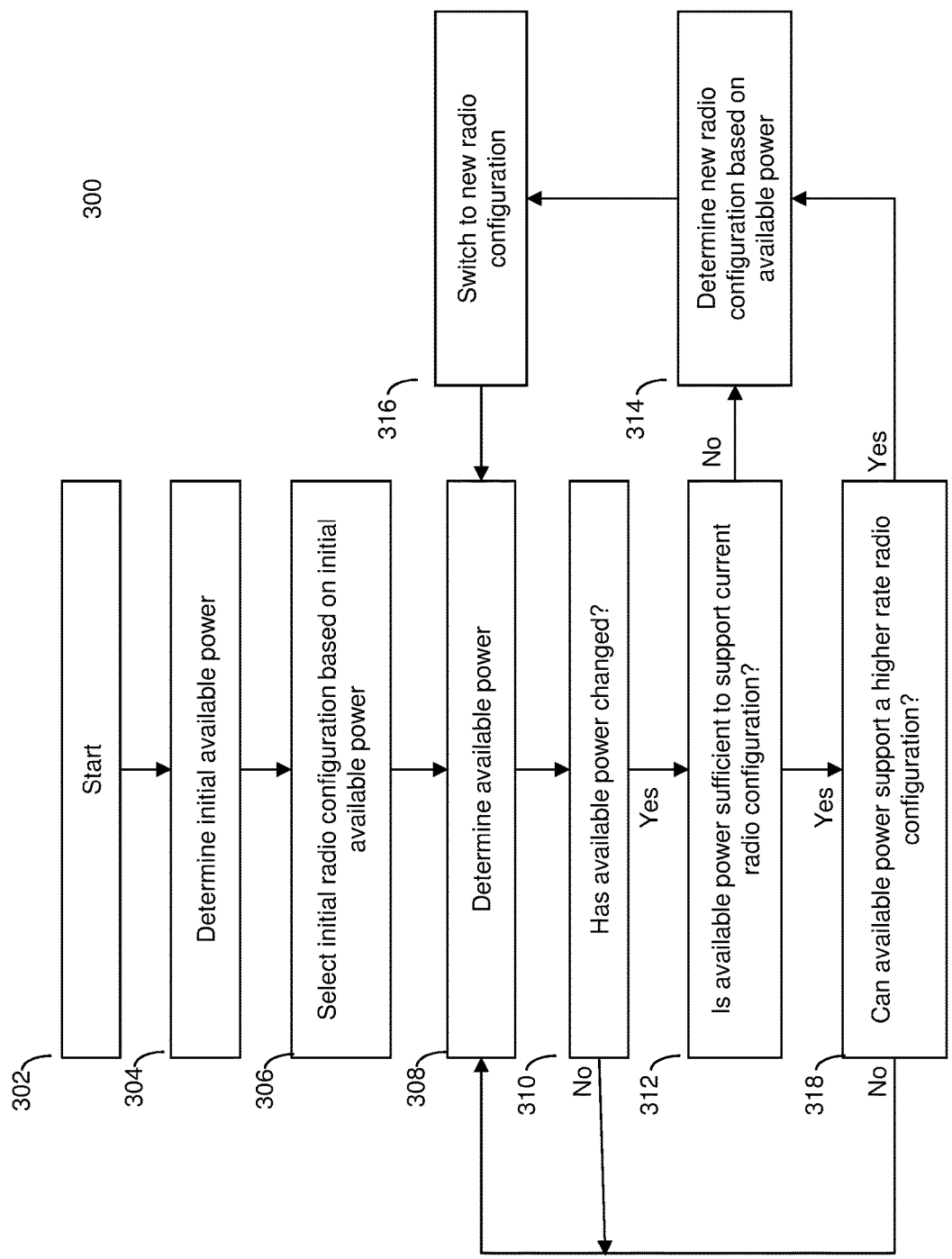
FIG. 3 is a flow chart summarizing operations of an example of the disclosure.

FIG. 3 is a flow chart 300 summarizing operating the DPU 108.

Processing starts at 302.

In 304, the power management module 204 determines the initial power available from the connected lines 104a, 104b and 104c. However, some customers may switch off their CPE when not in use, or the CPE might be switched off for some other reason. Power will only be available for reverse powering from the connected lines where the associated CPE is actually online (powered on). The ETSI specification (TS 101548) sets out protocols for signaling the resistivity of the line at start up, which is dependent on the length and quality of the copper line. A class verification function provides DPU and CPE mutual identification, giving a signature classification represented by a specific current level. The CPE can then output up to this maximum current level at an output voltage of up to 60V. The DPU 108 can draw as much power as needed up to the maximum that can be supported by each line as given by the output voltage and maximum current (e.g. 60V DC and 250mA results in supported power of 15VA~=15W for that line).

However, not all the supported power from each CPE is available for use by the DPU. Each of the subscriber ports 202 that connect an active (online) subscriber line will draw power in operation. Thus, the initial available power is equal to the sum of the power supported by each line (that is online), minus the power needed to operate the subscriber ports that are online.

In 306, the initial radio configuration is selected based on initial available power.

FIG. 4 shows a table 400 of an example of different radio transceiver configurations 402 supported by the DPU 108 and specifically the radio transceivers 214, 216 and 218. The DPU 108 can select and use any one of these configurations, with each configuration 402 having an associated peak capacity (bandwidth) 404 and operating power requirement 406. They range from a simple 4G single-band configuration with a peak capacity of 150Mbps and a power requirement of 3W, to a more complex configurations such as one consisting of a combination of 5G mmWave, 5G multi-band and 4G multiband, which has a peak capacity of well over 1Gbps and a power requirement of 33W. Referring to FIG. 2, each radio configuration might involve use of one or more of the radio transceivers 214, 216 and 218. Thus, switching between radio configurations can involve switching on/off one or more of the transceivers, or extending the operating bandwidth or frequencies over which a transceiver is specified for.

The initial radio configuration that is selected needs to have a power requirement that is less than or equal to the initial available power. Thus, if we take the initial available power across all the connected xDSL ports to be 25W, then the radio configuration selected from the ones shown in table 400 would be the 5g mmWave and 5G multiband configuration, which has a power requirement of 20W and a peak capacity of 1Gbps. Whilst lower power configurations can also be supported by the initial available power, the configuration with the highest capacity is usually selected in examples of the disclosure.

Upon completing the start-up procedure whereby the detection, classification and power available from connecting CPEs is determined by the DPU, the DPU processor 206 reads the initial available power calculation available for the radio modem 212 from the power management module 204. Based on this information the processor 206 determines the optimal radio transceiver configuration that can be supported. The processor 206 then writes a suitable modem configuration file to memory 208 and initiates the modem start up procedure. Here the modem 212 is provided power by the power management module 204 and proceeds to read in its configuration file from memory 208 to determine which radio configuration to use. This includes deciding which transceivers 214, 216, 218 and associated radio technologies, frequencies and bandwidths it should scan for and advertise in subsequent connection establishment to the basestation (e.g. at the exchange 112).

Once the DPU 108 has an initial radio configuration selected and operational, there follows a continuous monitoring phase, where the reverse power available from the lines is determined in 308 in the same manner as in 304 earlier. If there is no change in the available power (at 310), processing continues with determining the available power in 308 until there is a change in available power. Once there is a change in the available power in 310, processing passes to 312.

At 312, a check is made to determine if the available power (from 308) is sufficient to support current radio configuration. As might be the case sometimes, the available power may have dropped since the DPU 108 was started up and the initial radio configuration selected, so that the available power might no longer be sufficient to support the initial radio configuration. This might happen if one or more of the CPEs is switched off following start up, thus depriving the DPU of some reverse power.

If there is no longer sufficient available power to support the current radio configuration, then processing passes to 314.

In 314, a new radio configuration based on the available power is determined. This is done like in 306 by looking for the highest capacity radio configuration that has a power requirement that is less than or equal to the available power. The configuration details are written to an updated configuration file and stored in memory 208.

In 316, a switch is made to the new radio configuration, before processing passes back to the monitoring phase starting at 308.

The switching to a new radio configuration involves the cellular radio modem 212 releasing the connection to the cellular basestation(s) it is connected to, and restarting its connection establishment procedure using the updated configuration file. In practice, the DPU 108 can also include a battery back-up, which can hold sufficient power to support any given radio configuration for a period of time after a drop in available power, and before the switch to a new radio configuration has completed. This provides a more graceful switch to a new radio configuration. In the absence of a battery back-up of similar, the DPU 108 would be forced to power down one or more of the radio transceivers immediately to reduce power consumption. Some traffic would be temporarily lost in such an event until higher layer protocols stabilize the connection on the remaining resources available.

However, if in 312 it is determined that the available power is sufficient to support the current radio configuration, processing passes to 318.

In 318, a check is made to determine if there is a higher rate (than the current rate) radio configuration that can be supported by the available power. This might occur if the available power increases, for example if previously offline CPEs are brought back online thus providing additional reverse power.

If a higher rate can be supported, then processing passes to 314, which determines which higher rate radio configuration can be supported before making the switch in 316. These operations are as described earlier above. Processing then passes back to the monitoring phase of 308.

To illustrate, if the available power changes from 25W to 35W, then there is sufficient power to support the highest rate radio configuration of 5g mmWave, 5G multiband and 4G multiband, which has a peak capacity of over 1Gbps.

If in 318 it is determined that a higher rate cannot be supported, then processing passes back to continuous monitoring starting at 308.

In another example of the disclosure, the backhaul connection is provided over a hybrid wired and wireless backhaul connection. The wired connection could be fiber or copper for example, as in a typical ADSL or VDSL/G.fast arrangement. However, a wireless backhaul is also provided as described above. The wireless backhaul can be used for load sharing, or as a failover option if the wired backhaul connection fails.

In such a hybrid arrangement, the available power from the reverse powering will need to be shared between the wired and wireless backhaul connections. Thus, instead available power for the wireless radio configuration will be reduced by the power required by the wired connection, before the wireless radio configuration can be determined (in 314).

Exemplary embodiments of the invention are realized, at least in part, by executable computer program code which may be embodied in an application program data. When such computer program code is loaded into the memory 208 of the DPU 108, it provides a computer program code structure which is capable of performing at least part of the methods in accordance with the above described exemplary embodiments of the disclosure.

A person skilled in the art will appreciate that the computer program structure referred can correspond to the flow chart shown in FIG. 3, where each operations of the flow chart can correspond to at least one line of computer program code and that such, in combination with the processor 206 in the DPU 108, provides apparatus for effecting the described process.

In general, it is noted herein that while the above describes examples of the disclosure, there are several variations and modifications which may be made to the described examples without departing from the scope of the present disclosure as defined in the appended claims. One skilled in the art will recognize modifications to the described examples.

The invention claimed is:

1. A method of operating a distribution point unit, the distribution point unit having a wireless backhaul connection and one or more electrically wired access connections to respective customer premises equipment, the distribution point unit being electrically powered by the one or more electrically wired access connections, the method comprising:
    determining a power available to the distribution point unit from the one or more electrically wired access connections; and
    switching the wireless backhaul connection from a first wireless configuration to a second wireless configuration based on the determined power available, wherein the first wireless configuration and the second wireless configuration have different power utilizations.

2. The method as claimed in claim 1, wherein the second wireless configuration has a power utilization that is no greater than the determined available power.

3. The method as claimed in claim 1, wherein the second wireless configuration has a higher power utilization than the first wireless configuration.

4. The method as claimed in claim 1, wherein the second wireless configuration has a lower power utilization than the first wireless configuration.

5. The method as claimed in claim 1, wherein the first wireless configuration and the second wireless configuration have different data rates.

6. The method as claimed in claim 1, wherein the distribution point unit further comprises a wired backhaul connection, and the determined power available for the wireless backhaul connection is reduced by the power required by the wired backhaul connection.

7. A distribution point unit comprising:
a wireless backhaul connection; and
one or more electrically wired access connections to respective customer premises equipment, the distribution point unit being electrically powered by the one or more electrically wired access connections and adapted to:
determine a power available to the distribution point unit from the one or more electrically wired access connections; and
switch the wireless backhaul connection from a first wireless configuration to a second wireless configuration based on the determined power available, wherein the first wireless configuration and the second wireless configuration have different power utilizations.

* * * * *